United States Patent
Hsu

(10) Patent No.: US 9,904,835 B1
(45) Date of Patent: Feb. 27, 2018

(54) SYSTEM AND METHOD FOR DETECTING MISSING FINGERS IN A FINGERPRINT SLAP

(71) Applicant: MorphoTrust USA, LLC, Billerica, MA (US)

(72) Inventor: Rein-Lien Hsu, Edison, NJ (US)

(73) Assignee: MorphoTrust USA, LLC, Billerica, MA (US)

( * ) Notice: Subject to any disclaimer, the term of this patent is extended or adjusted under 35 U.S.C. 154(b) by 13 days.

(21) Appl. No.: 15/223,488

(22) Filed: Jul. 29, 2016

Related U.S. Application Data

(60) Provisional application No. 62/198,331, filed on Jul. 29, 2015.

(51) Int. Cl.
*G06K 9/00* (2006.01)

(52) U.S. Cl.
CPC ..... *G06K 9/00013* (2013.01); *G06K 9/00067* (2013.01)

(58) Field of Classification Search
CPC ..... G06K 9/00067; G06K 2009/00959; G06K 9/00013; G06K 9/00087; G06K 9/4647; G06K 9/0008; G06K 9/001; G06K 9/00073; G06K 9/46; G06K 9/00006; G06K 9/36; G06F 21/32
See application file for complete search history.

(56) References Cited

U.S. PATENT DOCUMENTS

2013/0285968 A1* 10/2013 Christiansson ....... G06F 3/0416
345/173

OTHER PUBLICATIONS

"Innovatrics Segmentation SDK: Fingerprint image segmentation and quality control tool," [online] believed to be publicly available prior to Jul. 2015, 2 pages, retrieved from http://www.planetbiometrics.com/creo_files/upload/article-files/datasheet_segmentation_web.pdf.

"NIST Fingerprint Testing and Standards," dated Feb. 28, 2013, 75 pages, retrieved from http://biometrics.nist.gov/cs_links/fingerprint/NIST%20Fingerprint%20Testing%20Standards%20V2%2002282013.pdf.

"The Radon Transform—Theory and Implementation," PhD Thesis by Peter Toft, IMM, DTU, 1996, last modified Apr. 7, 1997, 3 pages, retrieved from http://cogsys.imm.dtu.dk/staff/ptoft/Radon/Radon.html.

Ulery et al., "Slap Fingerprint Segmentation Evaluation 2004: SlepSeg04; Analysis Report" NISTIR 7209, Mar. 8, 2005, 60 pages, retrieved from https://www.nist.gov/sites/default/documents/itl/iad/ig/ir_7209.pdf.

* cited by examiner

*Primary Examiner* — Kim Vu
*Assistant Examiner* — Michael Vanchy, Jr.
(74) *Attorney, Agent, or Firm* — Fish & Richardson P.C.

(57) ABSTRACT

A computer-implemented method that includes: accessing data encoding a fingerprint slap scan image, the fingerprint slap scan image including fingerprints of a number of fingers from a subject's hand; performing a radon transform of the fingerprint slap scan image to generate a sinogram, the sinogram represented on a grid having a lateral span axis and a projection angle axis; automatically identifying patterns of segments on the sinogram as finger lines, each finger lines corresponding to a particular finger present on the fingerprint slap scan image; and based on identified finger lines on the sinogram, automatically determining whether one or more fingers are missing on the fingerprint slap scan image.

13 Claims, 5 Drawing Sheets

SYSTEM AND METHOD FOR DETECTING MISSING FINGERS IN A FINGERPRINT SLAP

CROSS REFERENCE TO RELATED APPLICATIONS

This application claims the benefit of priority under 35 U.S.C. § 119(e) of U.S. Provisional Application No. 62/198,331, filed on Jul. 29, 2015, and entitled "System and Method for Detecting Missing Fingers in a Fingerprint Slap," which is incorporated herein by reference in its entirety.

TECHNICAL FIELD

This document generally relates processing of biometric images such as fingerprints.

BACKGROUND

Biometric images such as fingerprints are routinely captured from human subjects for identity verification.

SUMMARY

In one aspect, some implementations provide a computer-implemented method to identify a missing feature in a fingerprint slap scan, the method including: accessing data encoding a fingerprint slap scan image, the fingerprint slap scan image including fingerprints of a number of fingers from a subject's hand; performing a radon transform of the fingerprint slap scan image to generate a sinogram, the sinogram represented on a grid having a lateral span axis and a projection angle axis; automatically identifying patterns of segments on the sinogram as finger lines, each finger lines corresponding to a particular finger present on the fingerprint slap scan image; and based on identified finger lines on the sinogram, automatically determining whether one or more fingers are missing on the fingerprint slap scan image.

Implementations may include one or more of the following features. The method may include in response to determining that one or more fingers are missing on the finger print slap scan image, automatically determining the number of fingers present on the fingerprint slap scan image and automatically identifying which one or more fingers are missing from the fingerprint slap scan image. Automatically determining the number of fingers present on the finger print slap scan image may include automatically determining a respective lateral position and a global tilt angle for each finger present on the fingerprint slap scan image by automatically identifying, on the sinogram, a global projection angle on the projection angle axis of the grid and a corresponding projected intersection along the lateral span axis of the grid at the global projection angle, the global projection angle on the sinogram corresponding to the global tilt angle on the fingerprint slap scan image and each projected intersection on the sinogram indicating a respective lateral position on the fingerprint slap scan image. Automatically identifying the global projection angle may include automatically determining, on the identified finger lines, projected intersections that correspond to the respective lateral positions of each finger on the fingerprint slap scan image. The method may include identifying the particular projected intersection on corresponding particular finger line as a location having a peak sinogram value with a constraint of an expected finger width (or lateral finger span) along the global projection angle within the particular finger line.

The method may further include: for each particular finger line on the sinogram, refining the identified global projection angle to determine a respective projection angle that correspond to a refined tilt angle for the corresponding finger on the fingerprint slap scan image. Determining the respective projection angle may further include searching, on the sinogram, a refined location with a projection angle winthin an angle interval centered at the global projection angle, the refined location having an increased sinogram value than the sinogram value at the global projection angle on the particular finger line.

The method may additionally include performing an inverse radon transform of the sinogram on which a projected intersection and a projection angle have been identified with regard to each finger line on the sinogram to recover the corresponding lateral position as well as the corresponding tilt angle of each finger on the fingerprint slap scan image.

The method may further include: decimating the fingerprint slap scan image to lower a sampling rate of the fingerprint scan image prior to performing the radon transform.

The method may additionally include automatically binarizing the sinogram according to a defined threshold.

In another aspect, some implementations provide a computer system that includes at least one processor configured to: access data encoding a fingerprint slap scan image, the fingerprint slap scan image including fingerprints of a number of fingers from a subject's hand; perform a radon transform of the fingerprint slap scan image to generate a sinogram, the sinogram represented on a grid having a lateral span axis and a projection angle axis; automatically identify patterns of segments on the sinogram as finger lines, each finger lines corresponding to a particular finger present on the fingerprint slap scan image; and based on identified finger lines on the sinogram, automatically determine whether one or more fingers are missing on the fingerprint slap scan image.

Implementations may include one or more of the following features. The processor may be further configured to: in response to determining that one or more fingers are missing on the finger print slap scan image, automatically determining the number of fingers present on the fingerprint slap scan image and automatically identifying which one or more fingers are missing from the fingerprint slap scan image.

The processor may be configured to automatically determine the number of fingers present on the finger print slap scan image by: automatically determining a respective lateral position and a global tilt angle for each finger present on the fingerprint slap scan image by automatically identifying, on the sinogram, a global projection angle on the projection angle axis of the grid and a corresponding projected intersection along the lateral span axis of the grid at the global projection angle, the global projection angle on the sinogram corresponding to the global tilt angle on the fingerprint slap scan image and each projected intersection on the sinogram indicating a respective lateral position on the fingerprint slap scan image.

The processor may be configured to automatically identify the global projection angle by: automatically determining, on the identified finger lines, projected intersections that correspond to the respective lateral positions of each finger on the fingerprint slap scan image.

The processor may be further configured to: identify the particular projected intersection on corresponding particular finger line as a location having a peak sinogram value with a constraint of an expected finger width (or lateral finger span) along the global projection angle within the particular finger line.

The processor may be further configured to: for each particular finger line on the sinogram, refine the identified global projection angle to determine a respective projection angle that correspond to a refined tilt angle for the corresponding finger on the fingerprint slap scan image.

The processor may be further configured to determine the respective projection angle by: searching, on the sinogram, a refined location with a projection angle wintinan an angle interval centered at the global projection angle, the refined location having an increased sinogram value than the sinogram value at the global projection angle on the particular finger line.

The processor may be further configured to: perform an inverse radon transform of the sinogram on which a projected intersection and a projection angle have been identified with regard to each finger line on the sinogram to recover the corresponding lateral position as well as the corresponding tilt angle of each finger on the fingerprint slap scan image.

The processor may be further configured to: decimate the fingerprint slap scan image to lower a sampling rate of the fingerprint scan image prior to performing the radon transform.

The processor may be further configured to: automatically binarize the sinogram according to a defined threshold.

In yet another aspect, some implementations provide a non-transitory machine-readable medium, comprising software instructions which when executed causes a computer processor to: access data encoding a fingerprint slap scan image, the fingerprint slap scan image including fingerprints of a number of fingers from a subject's hand; perform a radon transform of the fingerprint slap scan image to generate a sinogram, the sinogram represented on a grid having a lateral span axis and a projection angle axis; automatically identify patterns of segments on the sinogram as finger lines, each finger lines corresponding to a particular finger present on the fingerprint slap scan image; and based on identified finger lines on the sinogram, automatically determine whether one or more fingers are missing on the fingerprint slap scan image.

Implementations of the above techniques include a method, computer program product and a system. The computer program product is suitably embodied in a non-transitory machine-readable medium and includes instructions executable by one or more processors. The instructions are configured to cause the one or more processors to perform the above described actions.

The system includes one or more processors and instructions embedded in a non-transitory machine-readable medium that are executable by the one or more processors. The instructions, when executed, are configured to cause the one or more processors to perform the above described actions. The default position is not to use any external databases, but the system could be configured to perform a database check if needed.

The details of one or more aspects of the subject matter described in this specification are set forth in the accompanying drawings and the description below. Other features, aspects, and advantages of the subject matter will become apparent from the description, the drawings, and the claims.

DESCRIPTION OF DRAWINGS

Like reference symbols in the various drawings indicate like elements.

DETAILED DESCRIPTION

Fingerprint is a common form of biometric data for identity verification. Fingerprint slap scan images are routinely captured from fingerprint scanner devices. A captured fingerprint slap image may contain errors in that images of extra fingers may be captured or some finger features may be missing from the fingerprint slap scan image. The volume of such data and the repetitive manner in which such data is being capture warrant automated processing of fingerprint slap scan images. For one thing, such automated processing includes components to interact with the human operator. In one example, the automated processing identifies missing features in the fingerprint slap scan image. In another example, the automated processing estimates positions and orientations of finger features, missing or present, in the slap scan image.

Figure 1:
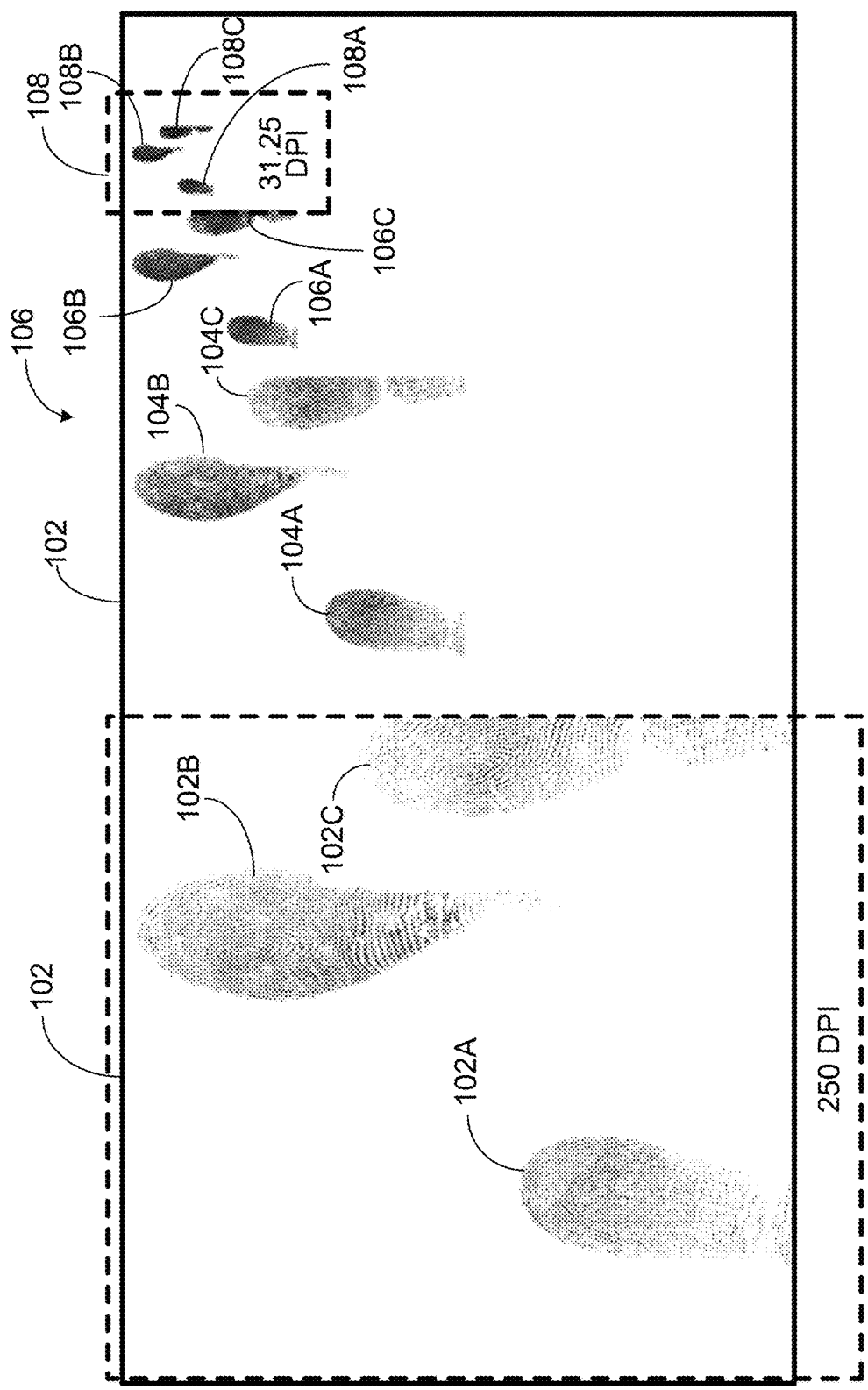
FIG. 1 illustrates an example of a captured fingerprint slap scan image at various scales.

FIG. 1 illustrates an example of a captured fingerprint slap scan image 100 at various scales. In this example, the fingerprint slap scan image 100 is presented on a grayscale. A morphological decimation is performed to reduce the dots per inch (DPI) of the source slap images from 250 DPI (left), to 125 DPI, to 61.5 DPI, and then to 31.25 DPI (right) so that fingers 102A, 102B, and 102C (left) are transformed to 104A, 104B, and 104C, and then to 106A, 106B, and 106C, and finally to 108A, 108B, and 108C. The decimated images are transformed to a near solid dark line so that subsequent processing can be performed. Generally, normalization resizing interpolation method may average the bright valleys and dark ridges. Such interpolation method may be less advantageous in generating good-quality finger-line over the ridge areas.

Figure 2:
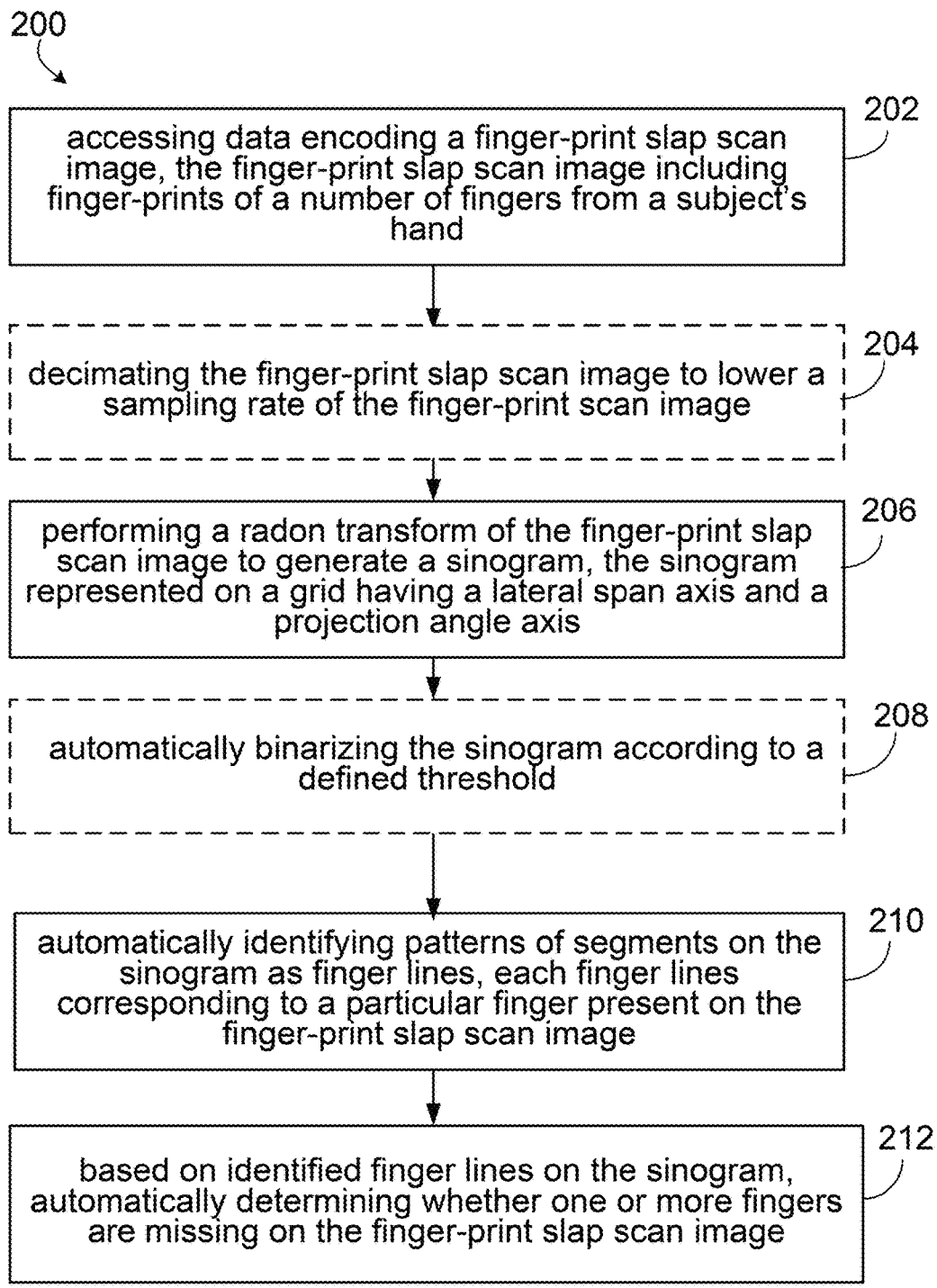
FIG. 2 is a flow chart of an example of identifying missing features in fingerprint slap scan images.

FIG. 2 is a flow chart 200 of an example of identifying missing features in fingerprint slap scan images. Initially, data encoding a fingerprint slap scan image may be accessed (202). The fingerprint slap scan image 102 may be obtained from a fingerprint slap scanner device, or a data storage device. The scanner device may include an optical fingerprint imaging device for capturing a digital image of the print using visible light. Such an optical scanner device may be a camera device that includes a touch surface for placing a finger, a light-emitting phosphor layer which illuminates the surface of the finger. The light reflected from the finger passes through the phosphor layer to an array of solid state pixels (e.g., a charge-coupled device (CCD)) which captures an optical image of the fingerprint. The scanner device may also include ultrasonic sensors such as piezoelectric transducers in obtaining fingerprint images. Some implementations may include capacitance sensors where sensor array pixels each act as one plate of a parallel-plate capacitor, the dermal layer (which is electrically conductive) acts as the other plate, and the non-conductive epidermal layer acts as a dielectric.

The fingerprint slap that includes one or more fingers from a subject's hand may then be decimated to a lower sampling rate (204). An example of the decimation process is illustrated in FIG. 1, as discussed above.

A radon transform may then may performed on the fingerprint slap scan image to generate a sinogram (206).

Figure 3A:
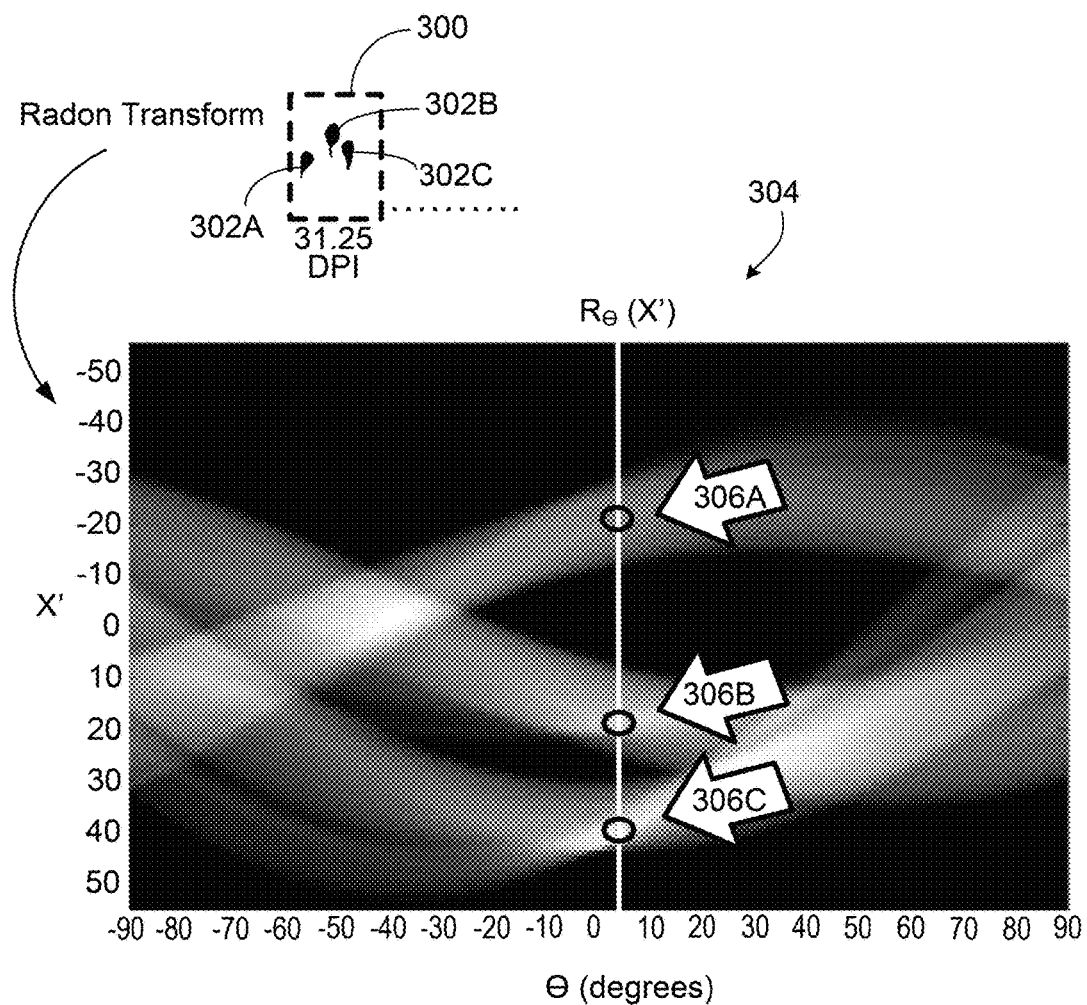
FIGS. 3A-3E illustrate example intermediary results during processing steps of identifying missing features in fingerprint slap scan images.

The sinogram may be represented on a grid having a lateral span axis and a projection angle axis. An example of this radon transform of an input fingerprint slap scan image is illustrated in FIG. 3A. As illustrated, finger features 302A to 302C of image 300 are presented in a 31.25 DPI scale. A radon transform is performed on image 300 to generate sinogram matrix 304 represented on a grid having a lateral span axis and a projection angle axis. Sinogram matrix 304 shows three segments that correspond to each of the finger features on image 300.

Figure 3B:
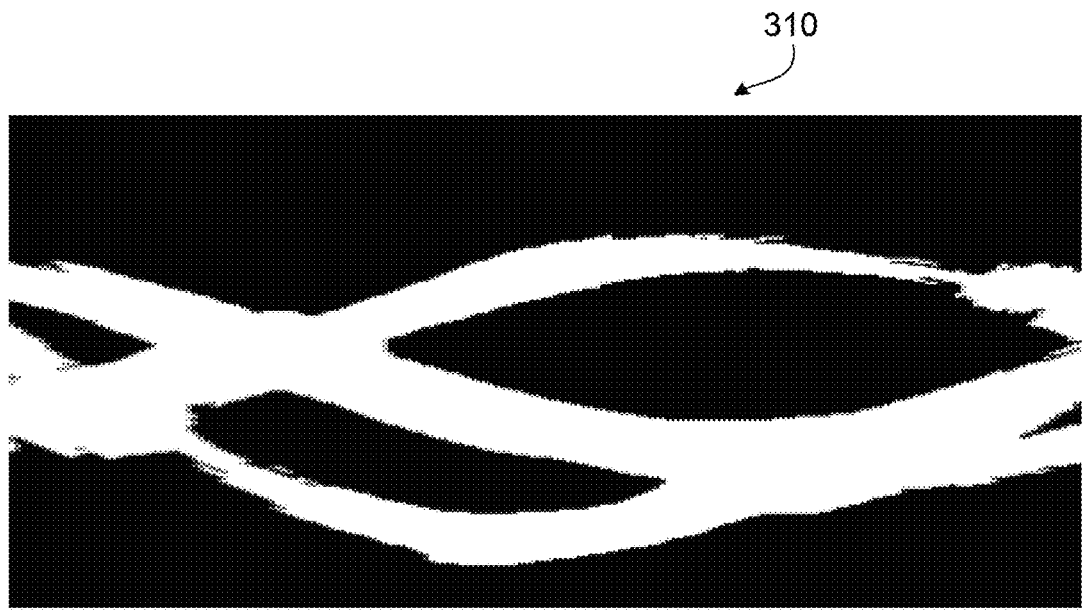

In some implementations, sinogram matrix 304 may then be automatically binaried according to a defined threshold (208). In other words, for sinogram values reaching the defined threshold, they may be replaced as "1" s while other sinogram pixels may be replaced with sinogram values of "0." An example of a binarized sinogram matrix 310 is shown in FIG. 3B. As illustrated, the three segments now resemble three white stripes on a black background.

Next, sinogram matrix 304, or binarized sinogram matrix 310, may be processed to automatically identify patterns of segments on the sinogram as finger lines (210). Here, each identified finger line corresponds to a particular finger feature present on the fingerprint slap scan image. In one example, the identification is carried out by searching for a fixed pattern of four segments (or fewer fingers if there are any missing fingers) in the projection angle axis of the sinogram matix 304 or binarized sinogram matrix 310. In this example, local maximums (with constraints of a known finger distance of, for example, about 0.5 inch and the maximum number of four fingers) may be detected vertically along the lateral span axis for each angle in the Radon space. The processing may generate results that include the number of fingers present in the slap, and the position and the angle of each finger line. For example, features 306A to 306C, as identified on a vertical line in the Radon space of sinogram matrix 304, correspond to the respective identified position on the lateral span axis and the particular orientation angle as indicated on the location on the projection angle axis.

Figure 3C:
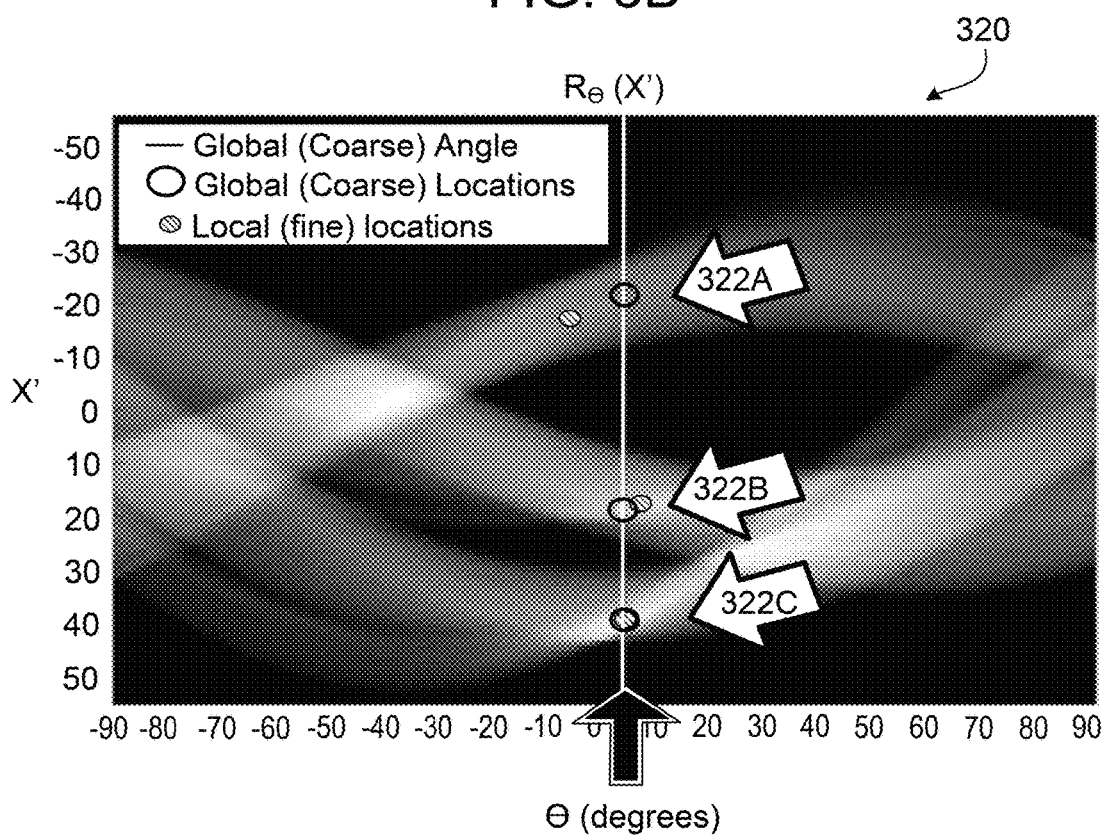

Based on identified finger lines on the sinogram matrix 304, local refinement of finger line may be performed to adapt to variations in tilt angles for each finger since an actual slap may contain fingers with a range of placement and tilt angles for the four (or fewer) fingers. In this local refinement, a search of the local maximum in the Radon space may be initialized by the detected Radon lines and constrained via the tolerances of line angles and line positions. For example the tolerance of line angles could be within a threshold range of plus minus 10 degrees, and the tolerance of line positions may be constrained by the width of the finger. In other words, some implementations may automatically determine whether one or more fingers are missing on the finger-print slap scan image (212). An example of the refinement is illustrated in FIG. 3C in which features 322A to 322C, as local fine locations, are identified near the earlier determined global course angle or global course location.

Figure 3D:
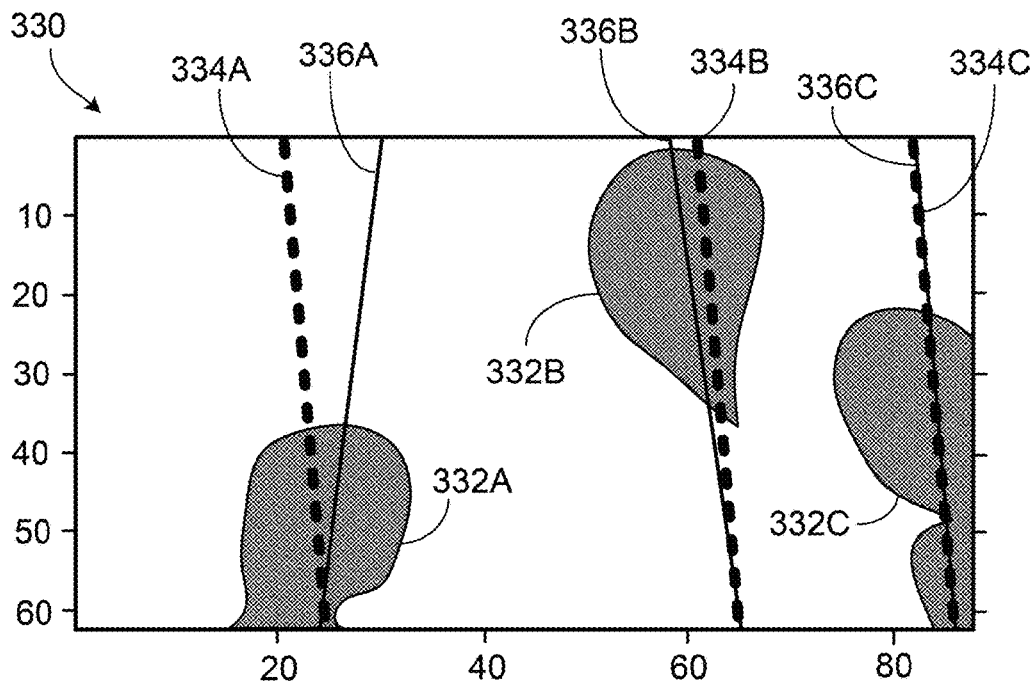
Figure 3E:
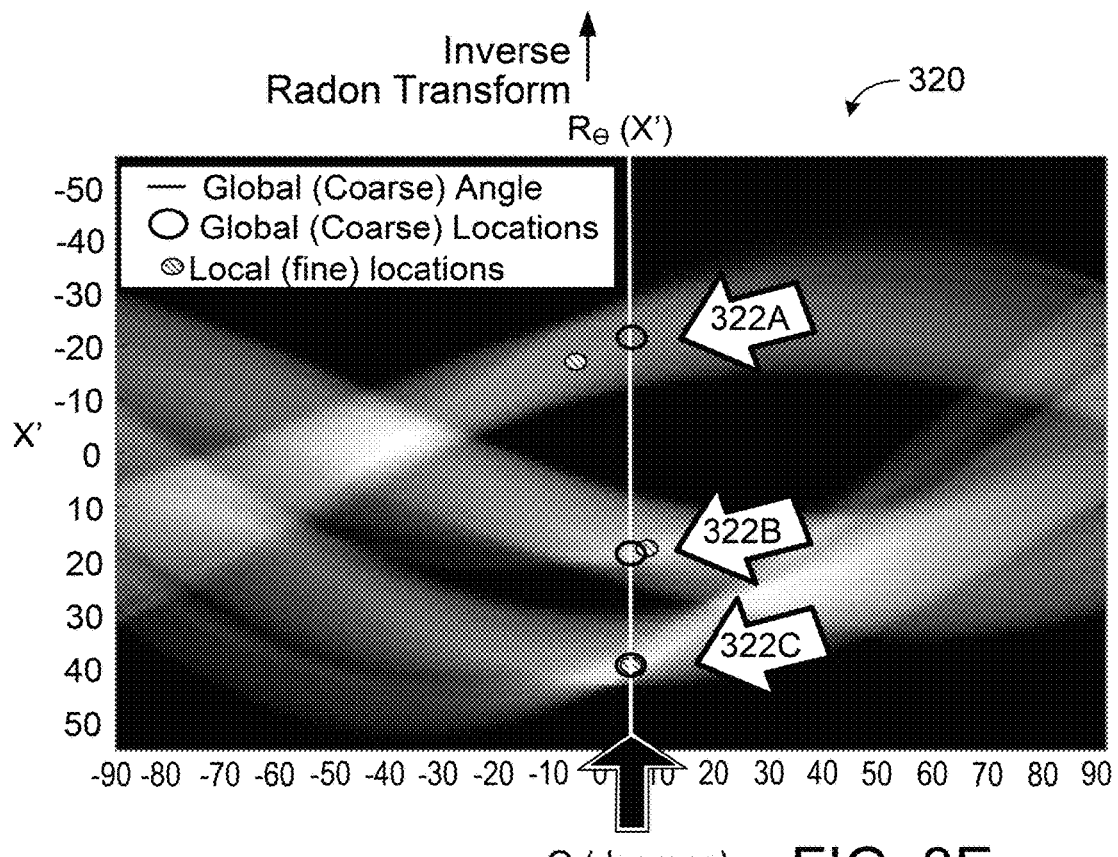

Based on the identified and refined locations, an inverse Radon transform may be performed to output the estimated finger locations, finger tilt angles, and hand orientation. An example is illustrated in FIGS. 3D and 3E in which sinogram matrix 320 with identified features of 322A to 322C are inverse Radon transformed to reveal locations and tilt angles 336A to 336C for each of the respective finger features 332A to 332C. Note that the initially estimated global (and hence course) tilt angles 334A to 334C are illustrated (as dashed lines) relative to tilt angles 336A to 336C (as solid lines).

In summary, finger prints are routinely captured. The captured fingerprints may sometime contain unexpected number fingers (extra fingers from the background or fewer fingers as an incomplete slap). A software capable of detecting true number of fingers (not blindly looking for the regular known number of fingers) presenting in the operating scanning device is desired and useful for rapid and accurate biometric collection.

Various implementations of systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

The use of the digital watermark is stateless. During an implemented method, the personally identifiable information of the user stored or held is not stored for future use. These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The elements of a computer may include a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the systems and techniques described here can be implemented on a computer having a display device (e.g., a CRT (cathode ray tube), LCD (liquid crystal display) monitor, LED (light-emitting diode) or OLED (organic light-emitting diode) monitors) for displaying information to the user and a keyboard and a pointing device (e.g., a mouse or a trackball)

by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, it will be understood that various modifications may be made without departing from the spirit and scope of the invention. For example, much of this document has been described with respect to messaging and mapping applications, but other forms of graphical applications may also be addressed, such as interactive program guides, web page navigation and zooming, and other such applications.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A computer-implemented method to identify a missing feature in a fingerprint slap scan, the method comprising:
   accessing data encoding a fingerprint slap scan image, the fingerprint slap scan image including fingerprints of a number of fingers from a subject's hand;
   performing a radon transform of the fingerprint slap scan image to generate a sinogram, the sinogram represented on a grid having a lateral span axis and a projection angle axis;
   automatically identifying patterns of segments on the sinogram as finger lines, each finger lines corresponding to a particular finger present on the fingerprint slap scan image; and
   based on identified finger lines on the sinogram, automatically determining whether one or more fingers are missing on the fingerprint slap scan image; wherein
   in response to determining that one or more fingers are missing on the finger print slap scan image, automatically determining the number of fingers present on the fingerprint slap scan image and automatically identifying which one or more fingers are missing from the fingerprint slap scan image; wherein
   automatically determining the number of fingers present on the finger print slap scan image comprises:
   automatically determining the number of fingers present on the finger print slap scan image comprises: automatically determining a respective lateral position and a global tilt angle for each finger present on the fingerprint slap scan image by automatically identifying, on the sinogram, a global projection angle on the projection angle axis of the grid and a corresponding projected intersection along the lateral span axis of the grid at the global projection angle, the global projection angle on the sonogram corresponding to the global tilt angle on the fingerprint slap scan image and each projected intersection on the sinogram indicating a respective lateral position on the fingerprint slap scan image; wherein
   automatically identifying the global projection angle comprises:
   automatically determining, on the identified finger lines, projected intersections that correspond to the respective lateral positions of each finger on the fingerprint slap scan image; and
   identifying the particular projected intersection on corresponding particular finger line as a location having a peak sinogram value with a constraint of an expected finger width (or lateral finger span) along the global projection angle within the particular finger line.

2. The method of claim 1, further comprising: for each particular finger line on the sinogram, refining the identified global projection angle to determine a respective projection angle that correspond to a refined tilt angle for the corresponding finger on the fingerprint slap scan image.

3. The method of claim 2, wherein determining the respective projection angle further comprises: searching, on the sinogram, a refined location with a projection angle within an angle interval centered at the global projection angle, the refined location having an increased sinogram value than the sinogram value at the global projection angle on the particular finger line.

4. The method of claim 1, further comprising: performing an inverse radon transform of the sinogram on which a projected intersection and a projection angle have been identified with regard to each finger line on the sinogram to recover the corresponding lateral position as well as the corresponding tilt angle of each finger on the fingerprint slap scan image.

5. The method of claim 1, further comprising:
   decimating the fingerprint slap scan image to lower a sampling rate of the fingerprint scan image prior to performing the radon transform.

6. The method of claim 1, further comprising:
   automatically binarizing the sinogram according to a defined threshold.

7. A computer system, comprising at least one processor configured to:
   access data encoding a fingerprint slap scan image, the fingerprint slap scan image including fingerprints of a number of fingers from a subject's hand;
   perform a radon transform of the fingerprint slap scan image to generate a sinogram, the sinogram represented on a grid having a lateral span axis and a projection angle axis;
   automatically identify patterns of segments on the sinogram as finger lines, each finger lines corresponding to a particular finger present on the fingerprint slap scan image; and
   based on identified finger lines on the sinogram, automatically determine whether one or more fingers are missing on the fingerprint slap scan image; wherein in response to determining that one or more fingers are missing on the finger print slap scan image, automatically determining the number of fingers present on the fingerprint slap scan image and automatically identifying which one or more fingers are missing from the fingerprint slap scan image; wherein the processor is configured to automatically determine the number of fingers present on the finger print slap scan image by:

automatically determining a respective lateral position and a global tilt angle for each finger present on the fingerprint slap scan image by automatically identifying, on the sinogram, a global projection angle on the projection angle axis of the grid and a corresponding projected intersection along the lateral span axis of the grid at the global projection angle, the global projection angle on the sinogram corresponding to the global tilt angle on the fingerprint slap scan image and each projected intersection on the sinogram indicating a respective lateral position on the fingerprint slap scan image; wherein the processor is configured to automatically identify the global projection angle by:

automatically determining, on the identified finger lines, projected intersections that correspond to the respective lateral positions of each finger on the fingerprint slap scan image; and identifying the particular projected intersection on corresponding particular finger line as a location having a peak sinogram value with a constraint of an expected finger width (or lateral finger span) along the global projection angle within the particular finger line.

8. The computer system of claim 7, wherein the processor is further configured to: for each particular finger line on the sinogram, refine the identified global projection angle to determine a respective projection angle that correspond to a refined tilt angle for the corresponding finger on the fingerprint slap scan image.

9. The computer system of claim 8, wherein the processor is further configured to determine the respective projection angle by: searching, on the sinogram, a refined location with a projection angle within an angle interval centered at the global projection angle, the refined location having an increased sinogram value than the sinogram value at the global projection angle on the particular finger line.

10. The computer system of claim 7, wherein the processor is further configured to: perform an inverse radon transform of the sinogram on which a projected intersection and a projection angle have been identified with regard to each finger line on the sinogram to recover the corresponding lateral position as well as the corresponding tilt angle of each finger on the fingerprint slap scan image.

11. The computer system of claim 7, wherein the processor is further configured to:

decimate the fingerprint slap scan image to lower a sampling rate of the fingerprint scan image prior to performing the radon transform.

12. The computer system of claim 7, wherein the processor is further configured to:

automatically binarize the sinogram according to a defined threshold.

13. A non-transitory machine-readable medium, comprising software instructions which when executed causes a computer processor to:

access data encoding a fingerprint slap scan image, the fingerprint slap scan image including fingerprints of a number of fingers from a subject's hand;

perform a radon transform of the fingerprint slap scan image to generate a sinogram, the sinogram represented on a grid having a lateral span axis and a projection angle axis;

automatically identify patterns of segments on the sinogram as finger lines, each finger lines corresponding to a particular finger present on the fingerprint slap scan image; and based on identified finger lines on the sinogram, automatically determine whether one or more fingers are missing on the fingerprint slap scan image; wherein in response to determining that one or more fingers are missing on the finger print slap scan image, automatically determining the number of fingers present on the fingerprint slap scan image and automatically identifying which one or more fingers are missing from the fingerprint slap scan image; wherein the processor is configured to automatically determine the number of fingers present on the finger print slap scan image by:

automatically determining a respective lateral position and a global tilt angle for each finger present on the fingerprint slap scan image by automatically identifying, on the sinogram, a global projection angle on the projection angle axis of the grid and a corresponding projected intersection along the lateral span axis of the grid at the global projection angle, the global projection angle on the sinogram corresponding to the global tilt angle on the fingerprint slap scan image and each projected intersection on the sinogram indicating a respective lateral position on the fingerprint slap scan image; wherein the processor is configured to automatically identify the global projection angle by:

automatically determining, on the identified finger lines, projected intersections that correspond to the respective lateral positions of each finger on the fingerprint slap scan image; and identifying the particular projected intersection on corresponding particular finger line as a location having a peak sinogram value with a constraint of an expected finger width (or lateral finger span) along the global projection angle within the particular finger line.

* * * * *

UNITED STATES PATENT AND TRADEMARK OFFICE
CERTIFICATE OF CORRECTION

PATENT NO. : 9,904,835 B1  
APPLICATION NO. : 15/223488  
DATED : February 27, 2018  
INVENTOR(S) : Rein-Lien Hsu Page 1 of 1

It is certified that error appears in the above-identified patent and that said Letters Patent is hereby corrected as shown below:

On the Title Page

Item (56), Column 2 (Other Publications), Line 16, replace "/default/" with --/default/files/--.

In the Specification

Column 5, Line 56, replace "course" with --coarse--.

Column 5, Line 57, replace "course" with --coarse--.

Column 5, Line 66, replace "course" with --coarse--.

Signed and Sealed this  
Second Day of July, 2019

Andrei Iancu  
*Director of the United States Patent and Trademark Office*